United States Patent
Reich

(10) Patent No.: US 10,145,644 B1
(45) Date of Patent: Dec. 4, 2018

(54) BOW BALANCING TOOL

(71) Applicant: Dead Center Archery Products, Beavertown, PA (US)

(72) Inventor: Todd A. Reich, Beaver Spring, PA (US)

(73) Assignee: Dead Center Archery Products, Beavertown, PA (US)

( * ) Notice: Subject to any disclaimer, the term of this patent is extended or adjusted under 35 U.S.C. 154(b) by 0 days.

(21) Appl. No.: 15/613,120

(22) Filed: Jun. 2, 2017

(51) Int. Cl.
  *F41B 5/14* (2006.01)
  *F16M 13/02* (2006.01)

(52) U.S. Cl.
  CPC ........... *F41B 5/1426* (2013.01); *F16M 13/02* (2013.01); *F41B 5/148* (2013.01); *F41B 5/1442* (2013.01); *F41B 5/1449* (2013.01); *F41B 5/1453* (2013.01)

(58) Field of Classification Search
  CPC .......... F16B 2/12; F16M 13/00; F16M 13/02; F41B 5/1442; F41B 5/1449; F41B 5/1453; F41B 5/148
  See application file for complete search history.

(56) References Cited

U.S. PATENT DOCUMENTS

| | | | | |
|---|---|---|---|---|
| 5,121,736 A * | 6/1992 | Hawk | ................ | F41B 5/14 124/86 |
| 5,240,211 A * | 8/1993 | Anderson | ............... | F16M 11/24 124/24.1 |
| 5,344,110 A * | 9/1994 | Scarpa | ..................... | F41B 5/14 124/86 |
| 5,482,241 A * | 1/1996 | Oglesby | .................. | F41B 5/14 124/23.1 |
| 6,032,911 A * | 3/2000 | Osborne | ................. | F41A 23/18 248/229.15 |
| 6,684,874 B2 | 2/2004 | Mizek et al. | | |
| 8,297,605 B2 * | 10/2012 | Lee | ......................... | F16C 11/106 269/130 |
| 2013/0233292 A1 * | 9/2013 | Gardner | .................. | F41A 23/10 124/25.6 |
| 2014/0196708 A1 | 7/2014 | Stokes | | |
| 2014/0361143 A1 * | 12/2014 | May | ..................... | F41B 5/1453 248/688 |
| 2018/0023916 A1 * | 1/2018 | Bunch | ................... | F41B 5/1453 |

OTHER PUBLICATIONS

Larry Wise, "Dealer Workbench," Arrow Trade Magazine.com, pp. 54-60.
Sniper Archery in Spain. Website: http://www.youtube.com/watch?v=JApnVb7TpPl&sns=em.
Engineering Experience in Italy. Website: http://www.xtcoachzone.it/prodotto/balance-your-bow/.

* cited by examiner

*Primary Examiner* — John Ricci
(74) *Attorney, Agent, or Firm* — Doster Greene, LLC

(57) ABSTRACT

A bow balancing tool according to various embodiments can include a mounting assembly, a floating bracket and a cradle assembly which provides a user an indication on where the bow is balanced to provide an improved shooting experience, better aiming stability and ultimately a more accurate configuration. The mounting assembly includes an elongated mounting plate attached to a housing having a pivotable shaft. The mounting assembly is configured to attach the bow balancing tool to the at least one flat surface. The floating bracket is attached to the pivotable shaft. The cradle assembly includes a clamping hub section, a clamping block section and a protective mechanism. The cradle assembly is attached to the floating bracket and holds the bow in a balanced configuration.

20 Claims, 10 Drawing Sheets

BOW BALANCING TOOL

TECHNICAL FIELD OF THE DISCLOSURE

The present invention relates generally to archery bows, and in particular, to a bow balancing tool to achieve increased aiming stability, better shot execution, and increased accuracy.

DESCRIPTION OF THE RELATED ART

Archery is a competitive sport that is growing in popularity. There has been a tremendous increase of interest in this sport, which has led to the development of numerous improvements to the bow and associated tools and implements. One major improvement has been the development of compound bows which employ a series of pulleys mounted at the ends of the bow. However, some compound bow may suffer from poor balance due to its inherent design, which results in a greater difficulty in maintaining the stability of the bow.

The compound bow can also suffer from vibrational movements during shooting which decrease the range and accuracy of the arrow. To achieve ultimate accuracy, the bow must suit the needs of an archer with optimal precision. Balance of the bow is one of the critical keys to success. Bow stabilizers and accessories are all developed with the objective to assist the archer with aiming stability and increased accuracy. With proper balance, the archer can achieve increased aiming stability, better shot execution and increased accuracy.

Attempts have been made to compensate for the increased weight and poor balancing characteristics. To maintain the stability and to balance the bow, counter balancing weights and additional tools like stabilizers and accessories are mounted on the bow in a suitable location to get an optimum desired configuration. However, traditional installation of counter balancing weights, stabilizers and accessories provide increased balance based only on an approximation or basic trial and error type of balancing. Neither method is very precise or efficient.

Accordingly, it may be desirable to provide a device and method that properly and effectively achieves a balanced bow, without the need for approximation when adding stabilization and weight to the bow. It is also may be desirable to provide a bow balancing technique that is relatively efficient and simple in terms of design and implementation that improves shooting experience, provides better aiming stability, and ultimately a more accurate configuration.

SUMMARY OF THE DISCLOSURE

The present invention may satisfy one or more of the above-mentioned desirable features. Other features and/or advantages may become apparent from the description which follows.

Various embodiments disclose a tool that assists a user to find the equilibrium point using counterbalances to balance the bow. In addition, the tool enables a user to determine the desired weight and feel of the bow's balance that best suits the specific user. The tool indicates whether the bow is evenly balanced or biased towards a particular direction, for example, leans or tilts forward, backward, left, right or a combination thereof. Based on the user's observation of the bow's position, the user can determine whether to take corrective actions with the addition or removal of one or more bow components, such as stabilizers, bars, rods, brackets, mounts, weights and/or any known component that can be attached to add weight to the bow. Further adjustments can be made by using extendable rods, rods of different lengths, weights of different sizes, and rearranging the positions of any of these bow components to adjust the center of gravity, which, therefore, effects the bow's tilt and bias. In addition, the securement mechanisms, for example, the mounts and brackets, that are often used to attach the bow components to the bow, can be configured and adjusted in numerous positions by pivoting, tilting and/or rotating such that these adjustments ultimately effects the bow's balance, including its tilt, bias, pitch, center of gravity or a combination thereof.

A device according to various exemplary embodiments can include a bow balancing tool that may contain a mounting assembly configured to attach the tool to at least one surface, a floating bracket, and a cradle assembly adaptable to hold the bow. In various embodiments, the floating bracket may be configured to pivot, rotate, or both. The mounting assembly may include an elongated mounting plate attached to a housing having a pivotable shaft by one or more attachment mechanisms. The elongated mounting plate can include a front end, a back end and a plate surface having a plurality of slots. The plurality of slots may include a plurality of first slots and a plurality of second slots. The plurality of first slots can be utilized to secure the front end of the elongated mounting plate to the at least one surface by a plurality of first securement mechanism. The plurality of second slots can be configured to hold a plurality of items that are utilized while using the bow.

The housing can be attached to the back end of the elongated mounting plate such that the axis of the pivotable shaft is perpendicular with respect to the elongated mounting plate. A first end of the pivotable shaft may be attached to an inlet of the housing by a first fastener mechanism such that the first end projects outside the housing. A second end of the pivotable shaft may extend out through an outlet of the housing. The floating bracket can be attached to the pivotable shaft by at least one second securement mechanism and can include a pair of arms each having a groove therein.

In various embodiments, the cradle assembly can include a clamping hub section, a clamping block section and a protective mechanism. The cradle assembly can be attached to the floating bracket. The clamping hub section may be attached to the clamping block by a second attachment mechanism to define an inner hollow space therebetween. The protective mechanism circumscribes the inner hollow space. The clamping hub section can further include a hub attached therewith by a second fastener mechanism. The cradle assembly may be placed within the floating bracket such that the hub of the clamping hub section fits into the grooves of the floating bracket and sits in a position such that the bow can rotate, for example, front to back or merely move within the plane. However, in other embodiments, the third securement mechanism can be used to secure the cradle assembly into position, when no movement is desired.

A method for utilizing the bow balancing tool to provide increased accuracy and stability according to various exemplary embodiments can include the steps of: providing a tool for balancing the bow comprising a mounting assembly having an elongated mounting plate attached to a housing having a pivotable shaft by screw mechanisms, a floating bracket having a pair of arms with each arm having a groove and a cradle assembly having a clamping hub section and a clamping block section attached by a second attachment mechanism to define an inner hollow space therebetween.

The method can also include mounting the tool on a secure and level surface by attaching the elongated mounting plate to the surface by a plurality of securement mechanism; and removing the cradle assembly from the tool by unscrewing a third securement mechanism, which connects the cradle assembly with the floating bracket. The method can further include positioning the bow to be balanced into an inner hollow space formed in the cradle assembly attached by unscrewing the second attachment mechanism to separate a clamping hub section and a clamping block section; and tightening the second attachment mechanism to attach the clamping hub section and the clamping block section to hold the bow in position. Generally, the user receives from the manufacturer a fully assembled tool kit with the securement mechanisms attached or included. However, if the tool kit is sold or received by the user in an unassembled state, then, the method of assembly can include tightening the at least one second securement mechanism attaching a second end of the pivotable shaft with the floating bracket to keep the floating bracket in a locked position and placing the bow positioned in the cradle assembly into the groove of the floating bracket and securing tightly by the third securement mechanism.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness. The skilled artisan will understand that the drawings described below are for illustrative purposes only. The drawings are not intended to limit the scope of the present teachings in any way.

DETAILED DESCRIPTION OF VARIOUS EMBODIMENTS

Figure 1:
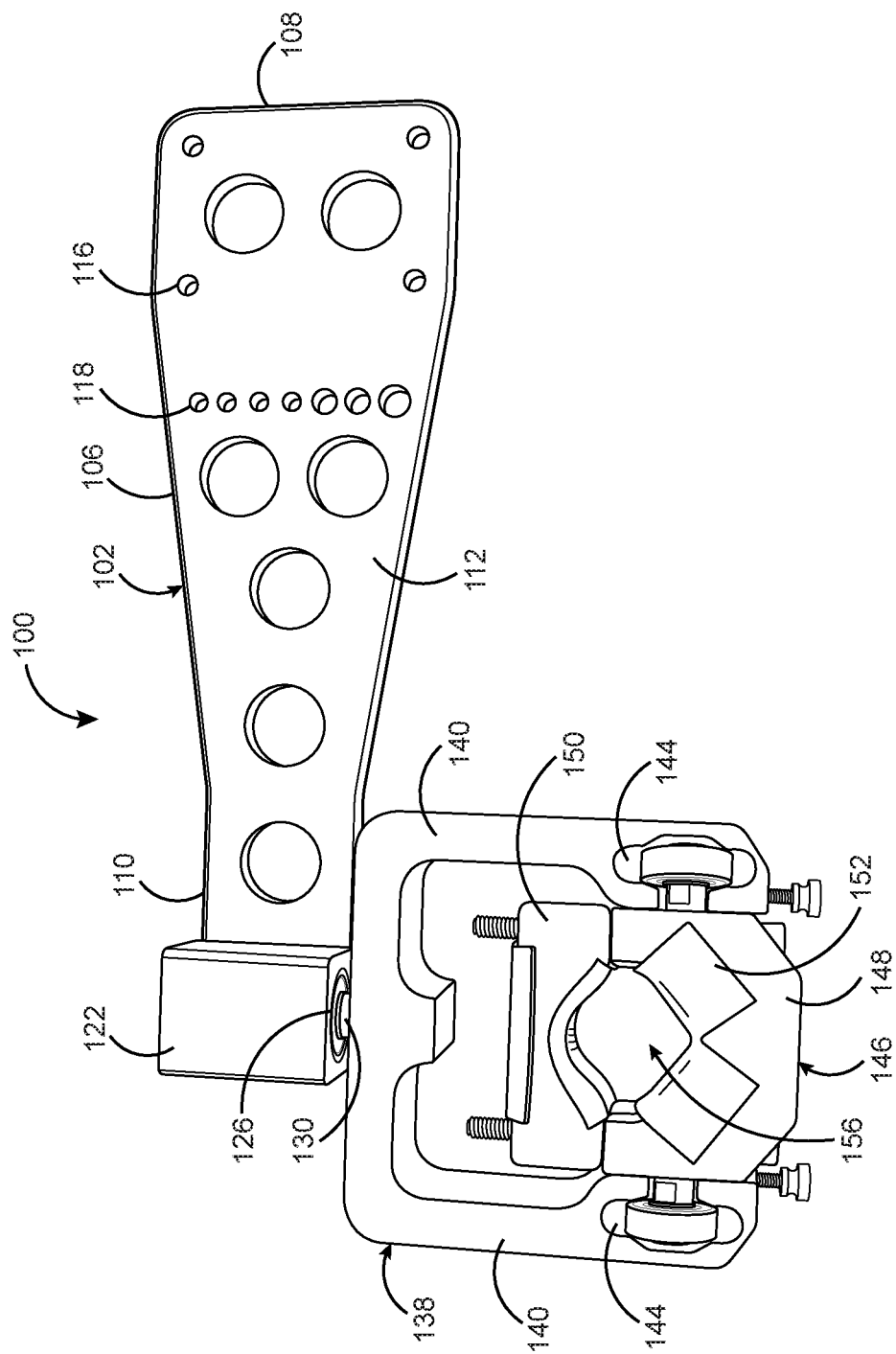
FIG. 1 illustrates a top perspective view of a bow balancing tool in accordance with the present teachings.
Figure 2:
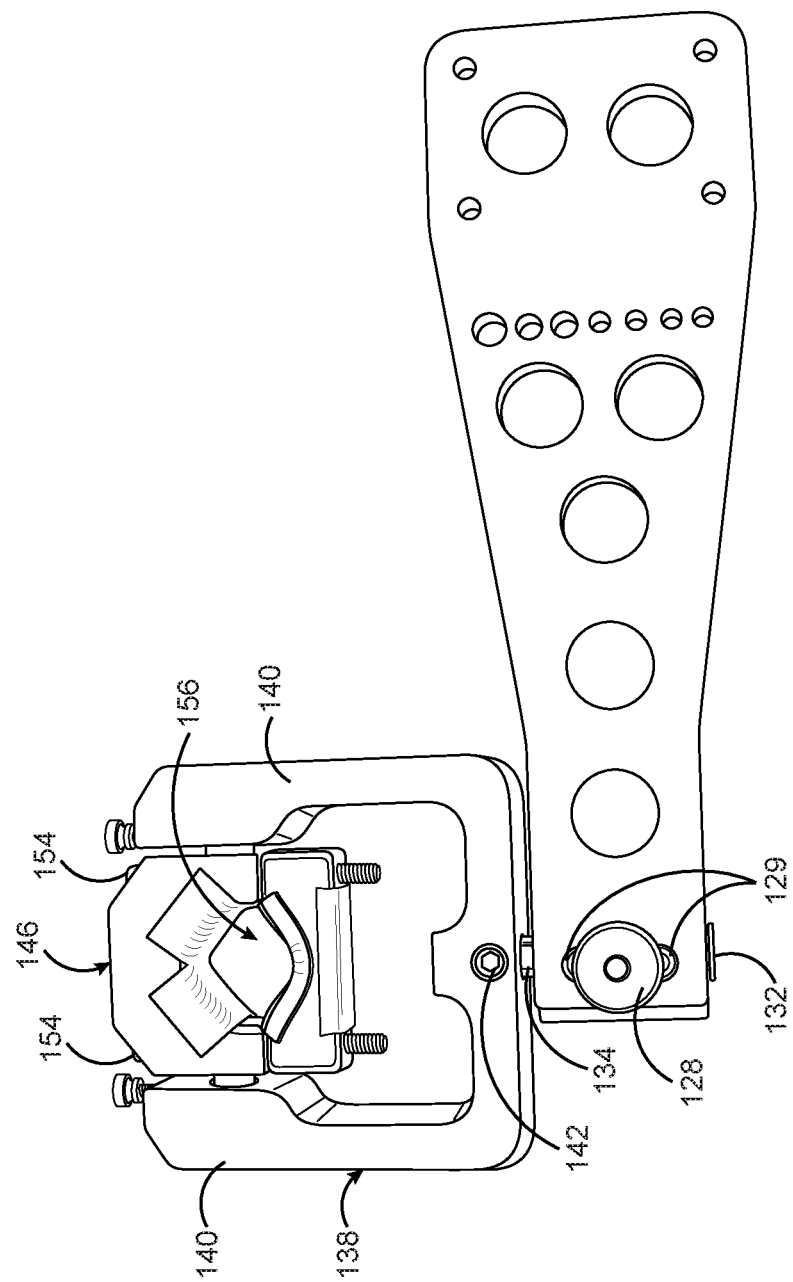
FIG. 2 illustrates a bottom perspective view of the bow balancing tool in accordance with the present teachings.
Figure 3:
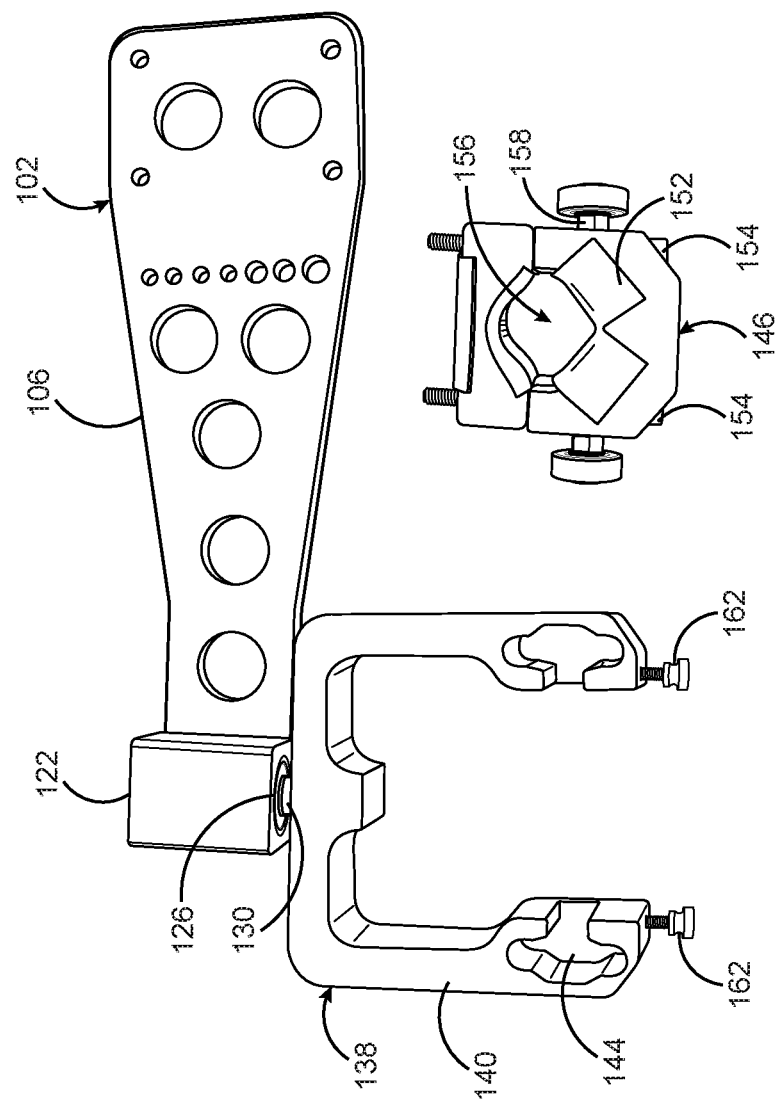
FIG. 3 illustrates a top perspective view of the bow balancing tool with a cradle assembly removed from the tool in accordance with the present teachings.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" mechanism +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Various embodiments provide a device that can read and indicate with certainty where a bow's balance truly is and effectively eliminate the guess work involved with stabilizer and weight installation. In various embodiments, the operation of the device may be relatively simple and robust to accommodate different bow models making the design more universal. This permits usage of the device without extensive training.

In various embodiments, the tool provides a true "read" on how the bow is balanced and gives the user the ability to make the appropriate adjustments to achieve the desired balance result. Various embodiments provide a tool that shows the direct result and effect of stabilizers, weight and their position on the balance of the bow.

Various embodiments disclose a tool that assists a user to find the equilibrium point using counterbalances to balance the bow. In addition, the tool enables a user to determine the desired weight and feel of the bow's balance that best suits the specific user. The tool indicates whether the bow is evenly balanced or biased towards a particular direction, for example, leans or tilts forward, backward, left, right or a combination thereof. Based on the user's observation of the bow's position, the user can determine whether to take corrective actions with the addition or removal of one or more bow components, such as stabilizers, bars, rods, brackets, mounts, weights and/or any known component that can be attached to add weight to the bow. Further adjustments can be made by using extendable rods, rods of different lengths, weights of different sizes, and rearranging the positions of any of these bow components to adjust the center of gravity, which, therefore, effects the bow's tilt and bias. In addition, the securement mechanisms, for example, the mounts and brackets, that are often used to attach the bow components to the bow, can be configured and adjusted in numerous positions by pivoting, tilting and/or rotating such that these adjustments ultimately effects the bow's balance, including its tilt, bias, pitch, center of gravity or a combination thereof.

Various embodiments provide a method and a balancing tool that can be attached to a bow to balance it to achieve increased aiming stability, better shot execution, and increased accuracy.

Various embodiments provide a tool that properly indicates when the bow is balanced to achieve optimal accuracy.

Various embodiments provide a tool that is easy to mount and serves as a holder for various accessories used when balancing the bow. The tool is also adaptable to hold different types of bows. The tool can be used with a variety of bows, for example, compound bows and recurve bows.

Various embodiments provide the user with a properly balanced bow by removing approximation and guess work by showing precisely the effect of weight and stabilizers on the bow's balance. The device is a precise instrument for tuning and provides a clear visual indication on where the bow is balanced. This accuracy cannot be accomplished with conventional devices. In comparison to conventional devices, the device results in a more optimized bow/stabilizer configuration and provides improved performance for the shooter. This optimum configuration can be achieved with ease because the device and method reveals where the bow is balanced and the weight is distributed.

An exemplary embodiment of a bow balancing tool 100, which can properly indicate where a bow 114 is balanced to achieve the highest goals in archery with optimal precision, is illustrated in FIGS. 1-7. The bow balancing tool 100 can be utilized to achieve increased aiming stability, better shot execution, and increased accuracy. When a typical bow is drawn, energy builds up in the limbs. Releasing the string releases all that energy. The arrow absorbs a lot of the energy as the bow speeds down the range. But some of the energy slams into the bow as well, causing the bow and every accessary attached on it to vibrate. This also creates noise.

Many bow users attach a stabilizer to the bow to mitigate such vibration and noise as the user aims and shoots the arrow. In general, the job of the stabilizer is to dampen or eliminate all handle movement other than the horizontal movement into the bow hand. The stabilizer must dampen any handle tipping and any torque rotation so that the arrow can be aimed and launched accurately and consistently to the target. In other words, the wasted energy of the power stroke and unwanted bow hand torque must be dampened or dissipated by the stabilizers during both the aiming phase and power stroke.

Thus, one of the most important factors for proper use of the bow is attaching and balancing the stabilizer and weights added to the bow. According to the present teachings, the tool 100 shows the direct result and effect of adding stabilizers, weight and their position on the balance of the bow 114. The present teachings provide the user an easy to use tool 100 to properly and effectively balance the bow 114 and remove approximation when adding stabilizers and weights to the bow 114.

In various embodiments, the bow balancing tool 100 can include a mounting assembly 102 configured to attach the tool 100 to at least one surface 104, a floating bracket 138 and a cradle assembly 146 adaptable to hold the bow 114. In the example shown in FIG. 7, the at least one surface 104 is depicted as a flat surface. However, the shape of the surface is not critical. It is known to one skilled in the art that other surface configurations may be employed without departing from the present teachings. The surface 104 can, for example, be a flat surface such as a square, rectangle, or circle; a curved surface; or individual regions which delineates separate regions.

The mounting assembly 102 may include an elongated mounting plate 106 attached to a housing 122 having a pivotable shaft 130 by one or more attachment mechanisms 129, for example, screws such as socket head screws, button head screws, etc. A shaft securement mechanism 128, for example, such as a knurled thumb screw, can be employed to lock or secure the pivotable shaft 130 to the housing 122 into a stationary position. Alternatively, the shaft securement mechanism 128 can be adjusted such that it allows the pivotable shaft to pivot relative to housing 122 during the balancing process. In various embodiments, the elongated mounting plate 106 can be configured, for example, to include a front end 108, a back end 110 and a plate surface 112 having a plurality of slots 116, 118. The plurality of slots 116, 118 may include a plurality of first slots 116 and a plurality of second slots 118. The plurality of first slots 116 secure the front end 108 of the elongated mounting plate 106 to the at least one flat surface 104 by a plurality of first securement mechanism 120 (see FIG. 7). The plurality of first securement mechanism 120 (see FIG. 7) can be, for example, a mounting screw. Any securement or attachment mechanism other than a mounting screw can be used to securely attach the mounting plate prohibiting it from moving. The plurality of second slots 118 is adaptable to hold a plurality of items (not shown) that are utilized while using the bow 114. The elongated mounting plate 106 is designed to mount directly on at least one flat surface 104 which can include a work bench or any other level surfaces.

The housing 122 can be attached to the back end 110 of the elongated mounting plate 106 such that the pivotable shaft 130 is positioned perpendicular with respect to the elongated mounting plate 106. The first attachment mechanism 129 utilized to attach the elongated mounting plate 106 with the housing 122 can be a socket head cap screw or any other attachment mechanism.

Figure 4:
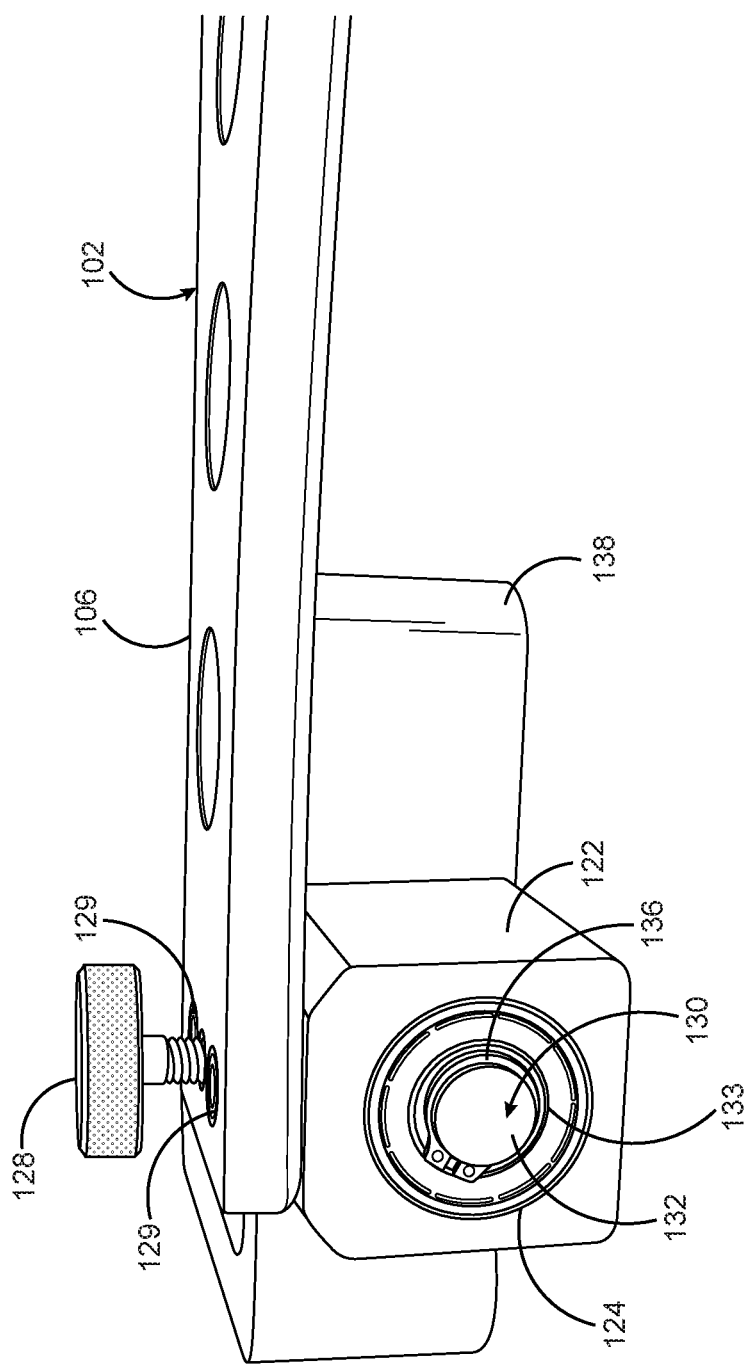
FIG. 4 illustrates a side perspective view of a housing attached with a mounting assembly of the bow balancing tool in accordance with the present teachings.

A first end 132 of the pivotable shaft 130 is pivotably attached to an inlet 124 of the housing by a first fastener mechanism 136, such that the first end 132 projects outside the housing as illustrated in FIG. 4. The first fastener mechanism 136 can be, for example, a retaining clip and a steel ball bearing arrangement and a snap ring that retains the pivotable shaft 130. The stainless steel ball bearings 133, which are pressed within the housing during manufacturing, allow unrestricted movements when balancing the bow 114 allowing for a true indication of the optimal balanced configuration. A second end 134 of the pivotable shaft 130 can be designed to extend out through an outlet 126 of the housing 122 into floating bracket 138.

Figure 5:
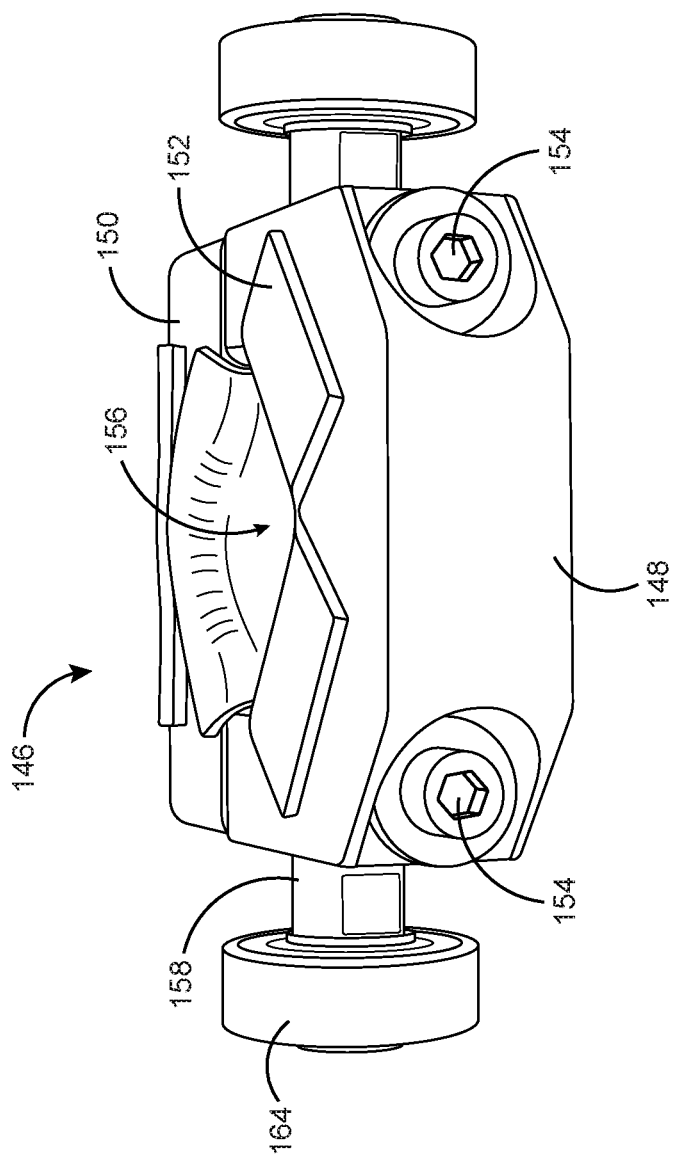
FIG. 5 illustrates a top perspective view of a cradle assembly of the bow balancing tool in accordance with the present teachings.
Figure 6:
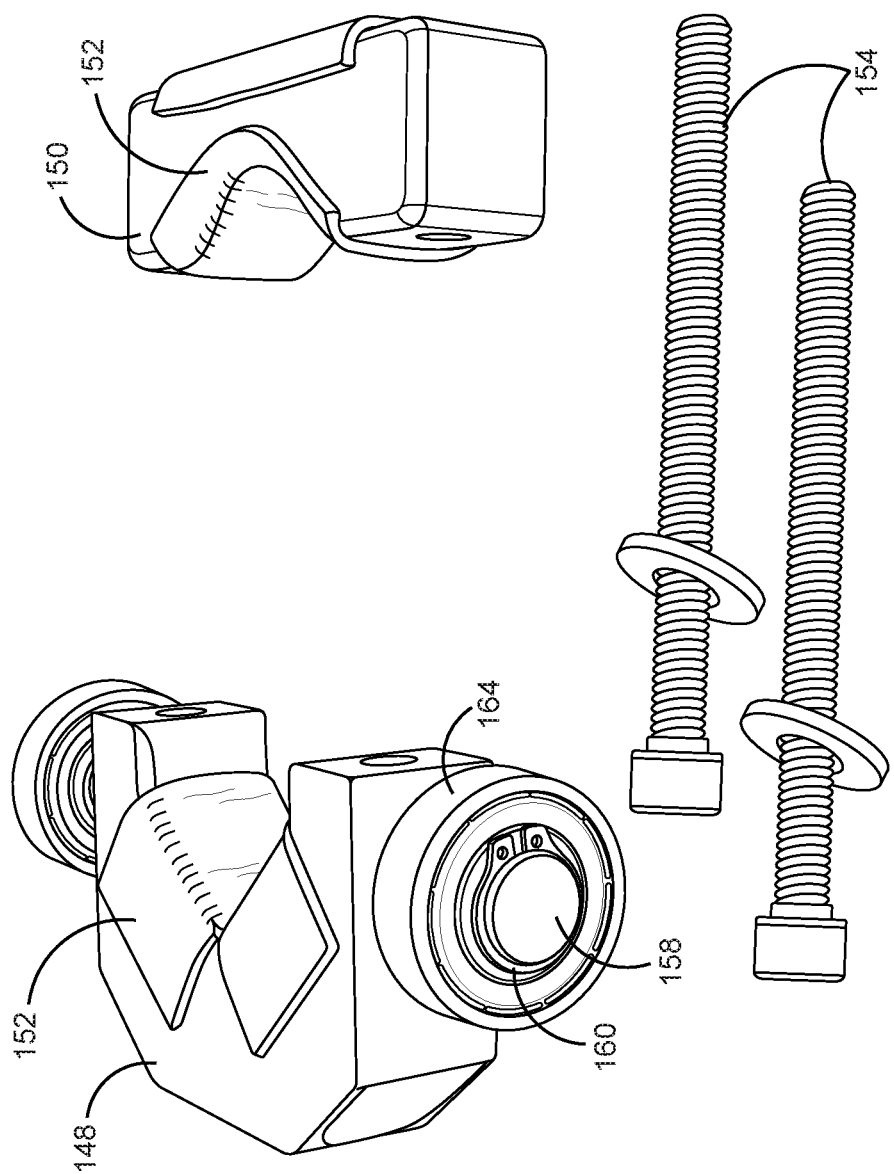
FIG. 6 illustrates a side perspective view of a clamping hub section, a clamping block section and a second attachment mechanism of the cradle assembly of the bow balancing tool in accordance with the present teachings.

The floating bracket 138 can be attached to the pivotable shaft 130 by at least one second securement mechanism 142. The second securement mechanism 142 can be, for example, a socket head cap screw. The floating bracket 138 includes a pair of arms 140 each having a groove 144 therein. The floating bracket 138 is adaptable to move freely and allows any bow to fit into the tool 100 to be balanced. The cradle assembly 146 is adaptable to hold the bow 114 placed within the floating bracket 138. In the examples shown, the floating bracket includes a pair of arms integrally formed as a unitary body. However, those skilled in the art would recognize that the floating bracket may be configured to include two or more arms, which are integrally formed or formed as separate components. FIG. 5 illustrates a top perspective view of the cradle assembly 146 of the bow balancing tool 100 in accordance with the present teachings. The cradle assembly 146 can include a clamping hub section 148, a clamping block section 150 and a protective mechanism 152 as illustrated in FIG. 6. The clamping hub section 148 is attached to the clamping block section 150 by a second attachment mechanism 154 to define an inner hollow space 156 therebetween. The second attachment mechanism 154 can be, for example, a socket head cap screw and a washer.

The clamping hub section 148 and the clamping block section 150 both can be configured to define a substantially U shaped structure on one side so as to form a circular inner hollow space 156 when attached by mechanism of the second attachment mechanism 154. Other than the U shape, other shapes and configurations may be used herein to define a cavity such as a C shape or a W shape. The circular inner hollow space 156 is adaptable to receive and firmly hold the bow 114 to be balanced. The protective mechanism 152 circumscribes the inner hollow space 156 and is configured to protect the bow 114 from scratch and tear. The protective mechanism 152 can be any adhesive foam padding. The clamping hub section 148 can further include a hub shaft 158 that extends outwardly from the clamping hub section 148 and holds one or more hub ball bearings 146 retained therein by the second fastener mechanism 160, for example, a retaining clip. The one or more ball bearings 164 enable the cradle assembly 146 to rotate and/or pivot (i.e., front-to-back) during the process of balancing the bow.

The cradle assembly 146 can be attached with the floating bracket 138 by a third securement mechanism 162 such that the hub shaft 158 of the clamping hub section 148 and hub bearings 164 fits into the grooves 144 of the floating bracket 138 and is secured in position by the third securement mechanism 162. The third securement mechanism 162 can be, for example, a pair of plastic thumb screws. The tool 100 provides a precise instrument for balancing the bow 114 and gives a clear visual indication on where the bow 114 is balanced to give an improved shooting experience, better aiming stability and ultimately a more accurate configuration.

Figure 7:
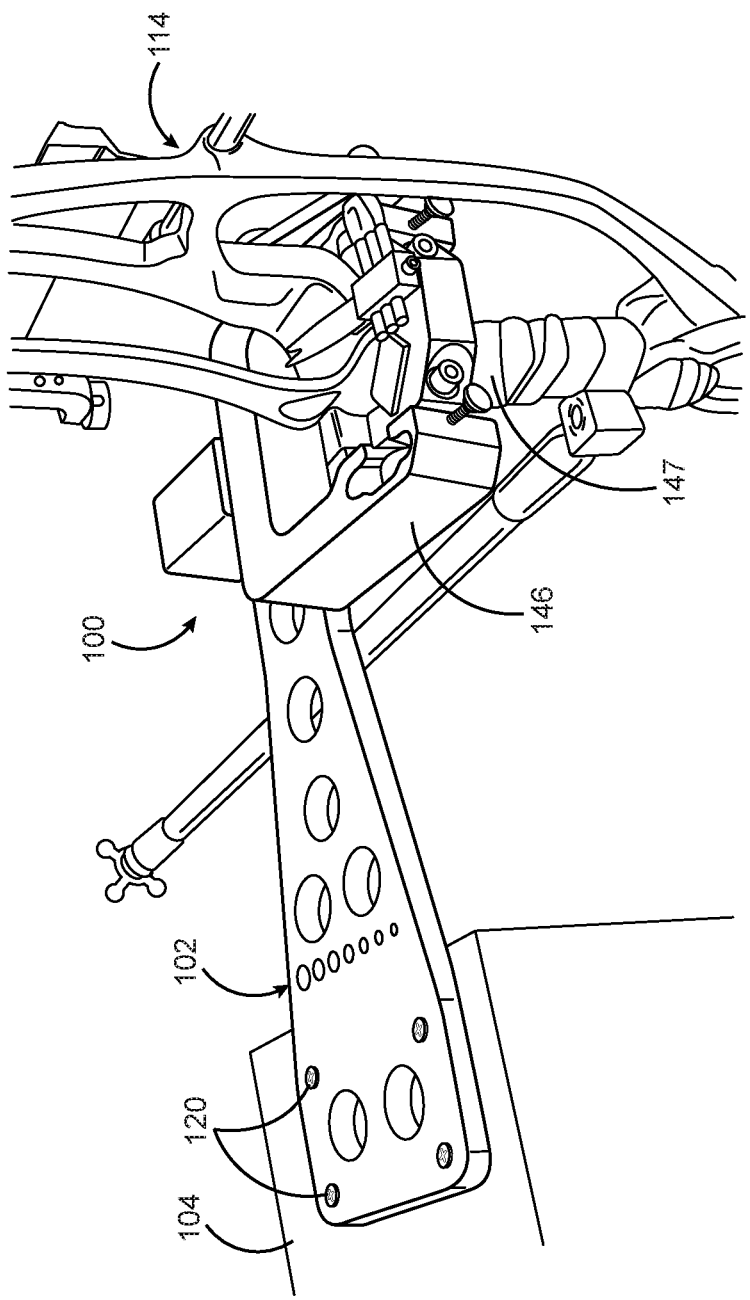
FIG. 7 illustrates a perspective view of the bow balancing tool in accordance with the present teachings in use.

FIG. 7 illustrates a perspective view of the bow balancing tool 100 when in use in accordance with the present teachings. To balance the bow 114, the tool 100 holds the bow at the grip section and allows it to pivot freely in two planes separately or in both simultaneously. The bow balancing tool 100 of the present teachings provides the user with the ability to make appropriate adjustments to achieve the desired optimal balance of the bow 114. The bow 114 to be balanced is positioned into the inner hollow space 156 formed in the cradle assembly 146 attached by unscrewing the second attachment mechanism 154 to separate the clamping hub section 148 and the clamping block section 150. Then the clamping hub section 148 and the clamping block section 150 are tightened by the second attachment mechanism 154 to hold the bow 114 in position.

The floating bracket 138 is maintained in a locked position by tightening or a pivotable position by adjusting the shaft securement mechanism 128 relative to the housing 122. In one embodiment, the cradle assembly 146 with the bow 114 is positioned into the groove 144 of the floating bracket 138 and optionally secured tightly by the third securement mechanism 162. The third securement mechanism 162 can be used to secure the cradle assembly 146 into position, when no movement is desired. However, in other embodiments, the cradle assembly 146 may be attached with the floating bracket by a third securement mechanism 162 such that the hub of the clamping hub section fits into the grooves of the floating bracket and sits in a position such that the bow can rotate, for example, front to back or merely move within the plane. Due to its design, the cradle assembly 146 will essentially position itself as the user tightens the securement mechanism(s).

The tool 100 shows the direct result and effect of adding stabilizers, weight and their position on the balance of the bow 114. The present teachings provide the user an easy to use tool 100 to properly and effectively balance the bow 114 and remove approximation when adding stabilizers and weights to the bow 114.

Figure 8:
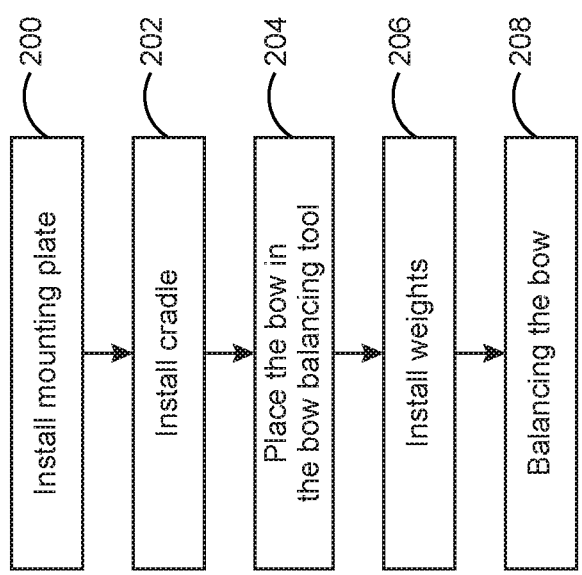
FIG. 8 illustrates a method of assembling and utilizing the bow balancing tool in accordance with the present teachings.

Referring to FIG. 8, when the balancing tool is provided as an unassembled kit, the balancing tool 100 can be assembled and the bow 114 balanced in the following manner In step 200, first install the mounting plate on a secure and level surface. The user should select a mounting location that will allow enough clearance for the bow's movement during balancing.

In step 202, install the cradle. At this stage of the assembly process, the bow should be ready to shoot. Namely, all accessories, such as sight, rest, stabilizer mounting hardware, stabilizer bars, etc. may be installed on the bow. Attach the cradle 146 to the riser/grip area 147 of the bow 114 (FIG. 7). Then, tighten the cradle 146 with screws so that the cradle 146 is securely attached to the bow 114 prohibiting the bow 114 from moving relative to the cradle 146, such that it does not move inside the cradle's hollow space 156. The front of the cradle 146 is designed such that it can be reversed so that the flat portion or V-shaped portion will touch or contact the front of the bow riser to accommodate virtually any shaped bow.

When assembled, the tool 100 may include a mounting assembly 102 having an elongated mounting plate 106 attached to a housing 122 having a pivotable shaft 130 by a first attachment mechanism 129, a floating balance bracket 138 having a pair of arms with each arm 140 having a groove 144 and the cradle assembly 146 having a clamping hub section 148 and a clamping block section 150 attached by an attachment mechanism 154 to define an inner hollow space 156 therebetween. The attachment mechanism 154 may be an adjustable attachment mechanism, such as a socket head cap screw and a washer.

In step 204, place the bow in the balancing tool 100 by tightening a screw 128 provided on the bottom of the tool 100 so that the free floating balance bracket 138 is locked into position. Then, place the bow, with the cradle installed, into pockets of the floating balance bracket 138.

In step 206, the weights are installed. First, the user tightens the screws on the rear of the floating balance bracket to prevent freedom of movement. Add one or more weights such that the weight is approximately a few ounces added to the front of the stabilizer. Then install, for example, approximately three to four times the amount of weight on the rear stabilizers as installed on the front stabilizer. The desired final balance bow position can be achieved by adjusting the bow, bow components, or both. In the final position, by way of example only, the bow sits in the balancer tool so that the bow is evenly balanced left-to-right and the front of the front of the bow is angled downward approximately at a 35° angle. This exemplary configuration should be achieved with securement mechanisms 128 and 162 to allow unrestricted freedom of movement of the bow. When this configuration is achieved, the bow will float independently, i.e., sit on its own, right itself similar to a buoy, without being forced or affected. This exemplary configuration is merely one example. Other balanced bow configurations can be achieved employing the same tool and the present teachings. It is noted that the weights may need to be further adjusted later to suit the user's personal preference.

In step 208, the bow is balanced. The user may adjust the first axis (front/back) before adjusting the second axis (left/right). To adjust the first axis, the user loosens the screws 162 at the rear of the floating balance bracket 138 to allow the bow to move freely without restriction. The user adjusts the front and rear stabilizer weight and the rear stabilizer mounting hardware position as needed so that the bow will sit approximately at a range of 35°-45° angle downward. This position may be referenced as the starting point for balancing the bow. To adjust the second axis, the user loosens the shaft securement mechanism 128 retaining the floating balance bracket 138 in place. Then, the user adjusts the amount of rear stabilizer weight and stabilizer mounting hardware position as needed to achieve an even and level left-right balance. To achieve a properly balance the bow, the user may need to repeatedly make adjustments to the rear, then return to making an adjustment to the front as the user fine tunes the weights and stabilizer position. The free floating balance bracket 138 functions as a tilting or pivoting platform. That is, the user can repeatedly adjust the position of the weights, stabilizer or both to balance the bow These adjustments of the bow 114 positioned within the tool 100 provides for the user a clear and easy-to-see indication when the bow 114 is balanced. The user can visually detect whether the bow tilts or pivots. In some embodiments, the bow balancing tool can be equipped with an indicator, such as an electronic a sensor, reader, or a level bubble, that can be permanently installed or removably attached thereon or used in conjunction with the tool to provide the user with an indication when the bow is properly balanced. In some embodiments, the indicator may consist of an audio and/or visual indicator that provides information to the user regarding whether the bow is evenly balanced or biased towards a particular direction, for example, leans or tilts forward, backward, left, right or a combination thereof. In some embodiments, it will readily be appreciated that with the kit-of-parts of the present teachings, the various parts can be transported in a disassembled condition and therefore in a compact arrangement.

Figure 9:
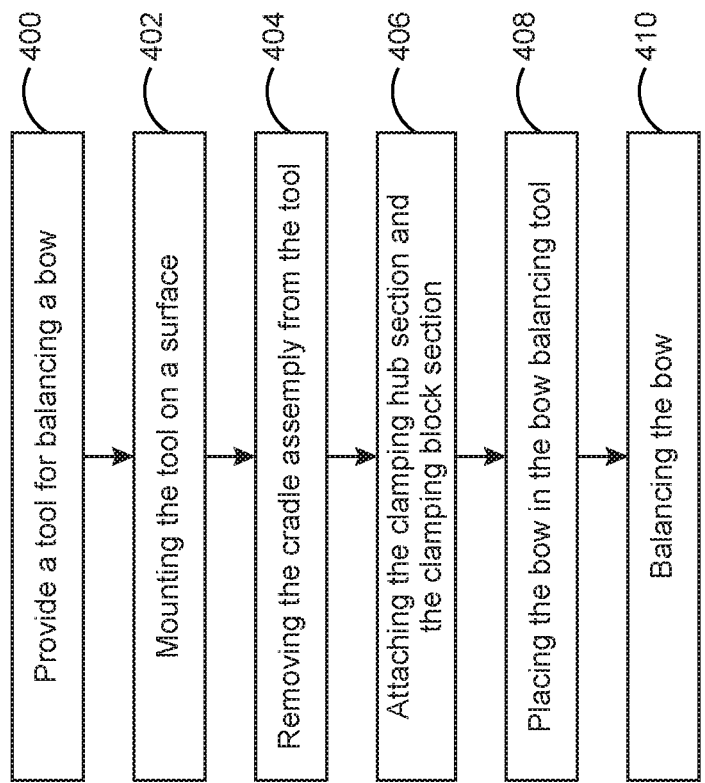
FIG. 9 illustrates a method for utilizing the bow balancing tool in accordance with the present teachings.

Referring to FIG. 9, when provided in an assembled configuration as illustrated in FIGS. 1-7, the method for utilizing the bow balancing tool 100 can include the steps of: providing a tool for balancing the bow comprising a mounting assembly having an elongated mounting plate attached to a housing having a pivotable shaft by a first attachment mechanism, a floating bracket having a pair of arms with each arm having a groove and a cradle assembly having a clamping hub section and a clamping block section attached by a second attachment means to define an inner hollow space therebetween as indicated in step 400.

In step 402, mount the tool on a secure and level surface by attaching the elongated mounting plate to the surface by a plurality of securement mechanisms.

In step 404, remove the cradle assembly from the tool by unscrewing a third securement mechanism which connects the cradle assembly with the floating bracket.

In step 406, tightening the second attachment means to attach the clamping hub section and the clamping block section to hold the bow in position. In step 408, placing the bow positioned in the cradle assembly into the groove of the floating bracket. In step 410, then balancing the bow as desired.

Figure 10:
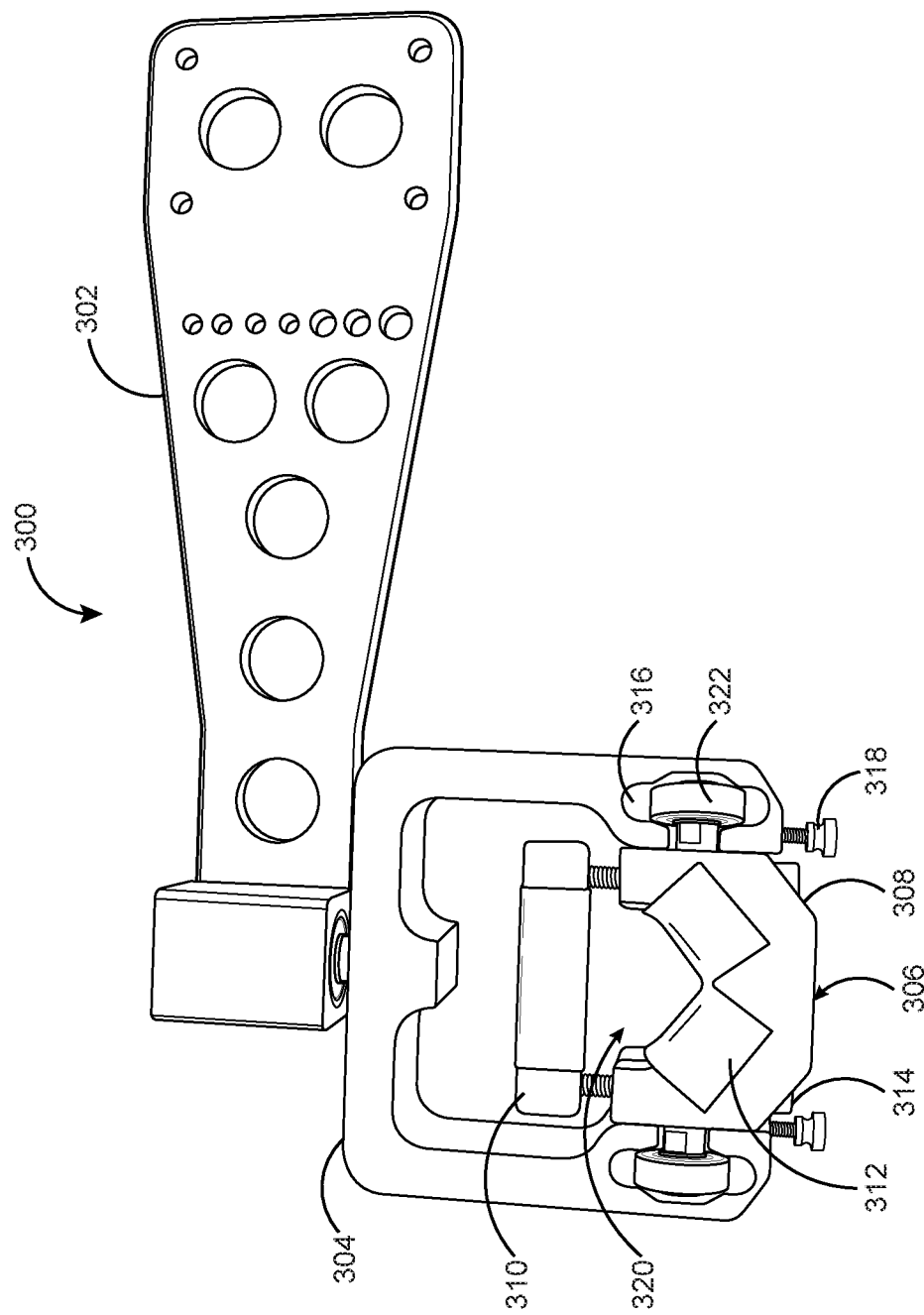
FIG. 10 illustrates a top perspective view of another embodiment of a cradle assembly attached to the bow balancing tool in accordance with the present teachings.

FIG. 10 illustrates a top perspective view of another exemplary embodiment of a cradle assembly utilized to form the bow balancing tool 300 in accordance with the present teachings. In this embodiment of the present teachings, the bow balancing tool 300 comprises a mounting assembly 302, a floating bracket 304 having a pair of grooves 316 and a cradle assembly 306. The mounting assembly 302 and the floating bracket 304 have the same functionality and configuration as those described in reference to and illustrated in FIG. 1.

The cradle assembly 306 is adaptable to hold a bow 114 (see FIG. 7) and is attached to the floating bracket 304. The cradle assembly 306 includes a clamping hub section 308, a clamping block section 310 and a protective mechanism 312. The clamping hub section 308 is attached to the clamping block section 310 by a second attachment mechanism 314 to define a D shaped inner hollow space 320 therebetween. The second attachment mechanism 314 can, for example, be a socket head cap screw and a washer. The clamping hub section 308 has a substantially U shaped structure on one side thereof. The clamping block section 310 forms a straight block which is attached to the clamping hub section 308 to form the substantially D shaped hollow space 320. The substantially D shaped hollow space 320 is adaptable to receive and hold the bow 114 (see FIG. 7) firmly that needs to be balanced. Shapes and configurations other than the D shape configuration may be used herein to define a cavity adaptable to receive and hold the bow 114.

The protective mechanism 312 circumscribes the D shaped inner hollow space 320 and is configured to protect the bow 114 from scratch and tear. The protective mechanism 312 can be any adhesive foam padding. The clamping hub section 308 further includes a hub 322 attached therewith by mechanism of a second fastener mechanism (not shown). The second fastener mechanism 160 can be a retaining clip and a steel ball bearing. The cradle assembly 306 is attached with the floating bracket 304 by a third securement mechanism 318 such that the hub 322 of the clamping hub section 308 fits into the grooves 316 of the floating bracket 304 and is secured in position by the third securement mechanism 318. The third securement mechanism 318 can be a pair of plastic thumb screws.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A bow balancing tool, comprising:
   a mounting assembly configured to attach the bow balancing tool to at least one surface;

a floating bracket connected to the mounting assembly; and a cradle assembly configured to receive and hold a bow including one or more bow accessories to be positioned within the floating bracket;

wherein the bow balancing tool is configured to provide a precise instrument for balancing the bow such that the bow balancing tool holds a grip section of the bow in a manner that permits the bow to pivot freely in at least two planes individually or in both planes simultaneously, and the bow balancing tool provides an indication that a center of gravity of the bow is evenly balanced or biased toward a preferred direction.

2. The bow balancing tool of claim 1, wherein the mounting assembly is integrally connected to a housing having a rotatable mechanism.

3. The bow balancing tool of claim 2, wherein the rotatable mechanism comprises a pivotable shaft.

4. The bow balancing tool of claim 2, wherein the housing is attached to the mounting assembly such that an axis of the rotatable mechanism is perpendicular with respect to the mounting assembly.

5. The bow balancing tool of claim 2, wherein the rotatable mechanism includes a first end and a second end, the first end of the rotatable mechanism extends through an inlet of the housing and is retained by a snap ring such that the first end projects outside the housing and the second end of the rotatable mechanism extends outward through an outlet of the housing into the floating bracket such that the floating bracket is attached to the rotatable mechanism by a socket head cap screw.

6. The bow balancing tool of claim 1, wherein the mounting assembly comprises an elongated mounting plate.

7. The bow balancing tool of claim 6, wherein the elongated mounting plate further comprises a front end, a back end and a plate surface having a plurality of first slots and a plurality of second slots.

8. The bow balancing tool of claim 1, wherein the floating bracket is configured to move freely and accommodate a variety of bows having different sizes and configurations.

9. The bow balancing tool of claim 1, wherein the cradle assembly further includes a clamping hub section attached to a clamping block to define an inner hollow space therebetween, wherein the inner hollow space is configured to receive and hold the bow for balancing.

10. The bow balancing tool of claim 9, wherein the floating bracket includes a pair of arms each having a groove therein.

11. The bow balancing tool of claim 10, wherein the cradle assembly resides within the floating bracket such that a hub of the clamping hub section fits into the grooves of the floating bracket and the hub sits in a position such that the bow rotates within the at least two planes.

12. A tool for balancing a bow, comprising:

a mounting assembly configured to attach the tool to at least one flat surface to balance the bow, the mounting assembly comprising:

an elongated mounting plate having a front plate end, a back plate end and a plate surface having a plurality of slots, the plurality of slots includes a plurality of first slots and a plurality of second slots, wherein the plurality of first slots is configured to secure the front plate end of the elongated mounting plate to the at least one flat surface; and a housing attached to the elongated mounting plate, the housing includes a pivotable shaft having a first shaft end and a second shaft end, the first end of the pivotable shaft extends through an inlet of the housing and is retained by a snap ring such that the first end projects outside the housing and the second end of the pivotable shaft extends outward through an outlet of the housing into the floating bracket such that the floating bracket is attached to the pivotable shaft by a socket head cap screw;

a floating bracket having a pair of arms attached to the second shaft end of the pivotable shaft, each of the pair of arms includes a groove therein;

a cradle assembly includes a clamping hub section, a clamping block section and a protective mechanism, the cradle assembly configured to receive and hold the bow to be positioned within the floating bracket, the clamping hub section attached to the clamping block to define an inner hollow space therebetween, the inner hollow space configured to receive and hold the bow, the protective mechanism configured to circumscribe the inner hollow space and to prevent scratching and tearing of the bow;

wherein the bow balancing tool is configured to provide a precise instrument for balancing the bow such that the bow balancing tool holds a grip section of the bow in a manner that permits the bow to pivot freely in at least two planes individually or in both planes simultaneously, and the bow balancing tool provides an indication that a center of gravity of the bow is evenly balanced or biased toward a preferred direction.

13. The tool of claim 12 wherein the housing is attached to the back plate end of the elongated mounting plate such that an axis of the pivotable shaft is perpendicular with respect to the elongated mounting plate.

14. The tool of claim 12, wherein the cradle assembly is configured having a flat portion or a V-shaped portion which is a reversible structure such that the cradle assembly is capable of accommodating a variety of bows having various sizes and configurations.

15. A method for utilizing a bow balancing tool to achieve a desired balanced position, the method comprises the steps of:

a) providing a tool for balancing the bow comprising a mounting assembly having an elongated mounting plate attached to a housing having a pivotable shaft, a floating bracket having a pair of arms with each arm having a groove and a cradle assembly having a clamping hub section attached to a clamping block section to define an inner hollow space therebetween;

b) mounting the tool on a surface by attaching the elongated mounting plate to the surface;

c) positioning the bow to be balanced into the inner hollow space formed in the cradle assembly attached by unscrewing an attachment mechanism to separate a clamping hub section and a clamping block section;

d) placing the bow positioned in the cradle assembly into the groove of the floating bracket; and e) balancing the bow by:
   a. adding at least one stabilizer onto the bow;
   b. adding at least one front weight element to a front portion of the stabilizer;
   c. adding at least one rear weight element to a rear portion of the stabilizer;
   d. adjusting a front-to-back axis of the bow by:
      i. loosening at least one first screw mechanism provided on the rear portion of the floating bracket such that the bow moves freely without restriction relative to the floating bracket; and ii. adjusting at least one of the at least one front weight element and the at least one rear weight element so that the bow is positioned relative to the bow balancing tool;

e. adjusting a left-to-right axis of the bow by:
 i. loosening at least one second screw mechanism provided at a bottom portion of the housing such that the floating bracket moves freely without restriction relative to the housing; and
 ii. adjusting at least one of the at least one front weight element and the at least one rear weight element so that the bow is positioned relative to the bow balancing tool.

16. The method of claim 15, wherein the floating bracket and the cradle assembly are configured to move freely and accommodate for balancing a variety of bows having different sizes and configurations.

17. The method of claim 15, wherein the cradle assembly is configured having a flat portion or a V-shaped portion which is a reversible structure such that the cradle assembly is capable of accommodating a variety of bows having various sizes and configurations.

18. A method of balancing a bow with a bow balancing tool, the bow balancing tool includes a mounting assembly rotatably connected to a floating bracket having a cradle assembly positioned therein and freely movable relative to the floating bracket, the method comprising:

securing the bow balancing tool by attaching the mounting assembly to a surface;

positioning the bow within the cradle assembly having an inner hollow space defined therein to receive and firmly hold the bow such that the bow resides within the floating bracket to pivot freely in at least two planes individually or in both planes simultaneously;

assessing, using the bow balancing tool, whether a center of gravity of the bow is evenly balanced or biased toward a preferred direction; and implementing, if the center of gravity of the bow is not evenly balanced or biased toward the preferred direction, a corrective action to adjust the center of gravity of the bow.

19. The method of claim 18, wherein the corrective action comprises at least one of adding, removing, adjusting and rearranging one or more bow components selected from at least one of a stabilizer, a bar, a rod, a bracket, a mount, a weight, at least one extendable rod, a plurality of rods having different lengths, and weights having different sizes.

20. The method of claim 18, wherein the cradle assembly is configured having a flat portion or a V-shaped portion which is a reversible structure such that the cradle assembly is capable of accommodating a variety of bows having various sizes and configurations.

* * * * *